(12) United States Patent
Bianchi et al.

(10) Patent No.: US 8,850,959 B2
(45) Date of Patent: *Oct. 7, 2014

(54) ESPRESSO COFFEE MACHINE

(75) Inventors: Roberto Bianchi, Bergamo (IT); Jacob Ellul-Blake, Seattle, WA (US)

(73) Assignee: La Marzocco, SRL, Florence (IT)

( * ) Notice: Subject to any disclaimer, the term of this patent is extended or adjusted under 35 U.S.C. 154(b) by 66 days.

This patent is subject to a terminal disclaimer.

(21) Appl. No.: 12/756,170

(22) Filed: Apr. 7, 2010

(65) Prior Publication Data

US 2011/0094392 A1    Apr. 28, 2011

(30) Foreign Application Priority Data

Oct. 23, 2009   (IT) .............. PO20090011 U

(51) Int. Cl.
   *A47J 31/44* (2006.01)
   *A47J 31/46* (2006.01)
   *A47J 31/52* (2006.01)
   *A47J 31/36* (2006.01)
   *A47J 31/56* (2006.01)

(52) U.S. Cl.
   CPC *A47J 31/36* (2013.01); *A47J 31/46* (2013.01); *A47J 31/52* (2013.01); *A47J 31/56* (2013.01)
   USPC ............................................. 99/288; 99/281

(58) Field of Classification Search
   CPC ........... A47J 31/36; A47J 31/52; A47J 31/56; A47J 31/46
   USPC ........... 99/281, 288, 285, 286, 290, 279, 280, 99/282, 283, 289 R, 291, 293, 297, 299, 99/302 R, 302 P, 275; 222/146.1, 145, 222/146.6, 640, 129.1, 129.2, 129.3, 129.4
   See application file for complete search history.

(56) References Cited

U.S. PATENT DOCUMENTS

| | | | | |
|---|---|---|---|---|
| 5,207,148 | A | * | 5/1993 | Anderson et al. ............... 99/281 |
| 2003/0070555 | A1 | * | 4/2003 | Reyhanloo ...................... 99/282 |
| 2007/0277676 | A1 | * | 12/2007 | Crivellin ......................... 99/288 |
| 2008/0190297 | A1 | * | 8/2008 | Gussmann et al. ............. 99/280 |

* cited by examiner

*Primary Examiner* — Henry Yuen
*Assistant Examiner* — Phuong Nguyen
(74) *Attorney, Agent, or Firm* — Hart IP Law & Strategies; James A. Sheridan

(57) ABSTRACT

Systems and methods for an improved espresso coffee machine are described. In one aspect, the improved espresso coffee machine includes one or more operating units, each of which at least includes a boiler, a pump, a heating unit, and a unit for aroma extraction and dispensing of the espresso coffee brew, including related conduits. Each unit is equipped with a system for controlling and adjusting the espresso coffee brewing parameters.

19 Claims, 3 Drawing Sheets

ESPRESSO COFFEE MACHINE

RELATED APPLICATIONS

This patent application claims priority to Italian utility model patent Application Serial No. PO2009U000011, filed on Oct. 24, 2009, titled "Improved Espresso Coffee Machine", and which is hereby incorporated in its entirety by reference.

TECHNICAL FIELD

The systems and methods of this invention disclosure relate to an improved espresso coffee machine.

BACKGROUND

As is known, brewing espresso coffee requires that a certain amount of water (usually around 60 ml) at 90° C. be forced through a coffee pod weighing around 14 g at a nominal pressure of 9 bar. It is also known that the quality of the espresso is greatly influenced by pressure and temperature. The physical properties of coffee vary depending on the variety. It follows, therefore, that the parameters for an optimal brew differ for each coffee variety.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

Systems and methods for an espresso coffee machine are described. In one aspect, the improved espresso coffee machine comprises one or more operating units, each of which at least comprises a boiler, a pump, a heating unit, and a unit for aroma extraction and dispensing of the espresso coffee brew, including related conduits. Each unit is equipped with a system for controlling and adjusting the espresso coffee brewing parameters.

BRIEF DESCRIPTION OF THE DRAWINGS

Experts in the trade will better appreciate the technical advantages of the following described systems and methods for an improved espresso coffee machine from the following description with reference to the accompanying drawings, which illustrate a preferred non-limiting embodiment of it and in which.

DETAILED DESCRIPTION

Overview

Prior art machines are ordinarily equipped with a pump driven by an electrical, alternating current motor. Typically, although the pump is equipped with means for setting the water outlet pressure upon installation, the pressure subsequently cannot be adjusted at the user's will.

Moreover, the temperature usually is controlled by a heat exchanger, an electromechanical thermostat, or an electronic PID temperature controller. At best, these systems provide consistent temperature stability but cannot implement repeatable and customizable temperature profiles.

In contrast to conventional state-of-the-art espresso coffee machines, the following described systems and methods for improved espresso coffee machines provide, for example, an espresso coffee machine where the brewing parameters can be controlled and adjusted by the user. These novel systems and methods are now described in greater detail.

Exemplary Systems and Methods for an Improved Espresso Coffee Machine

Figure 1:
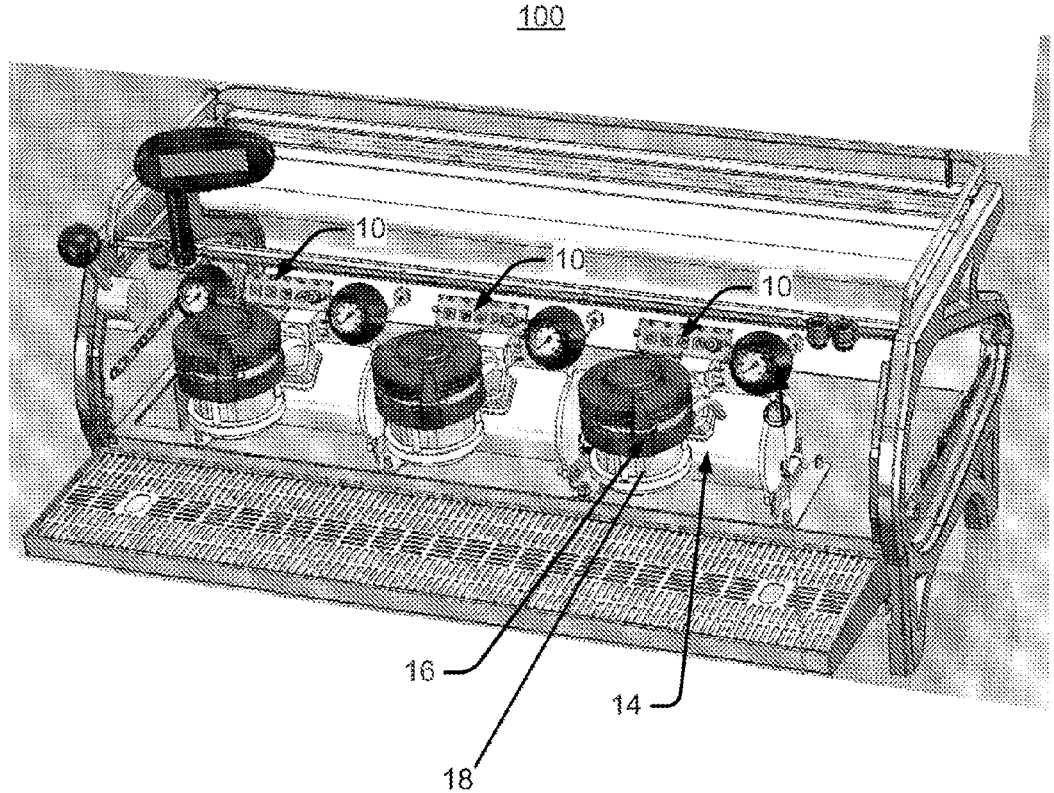
FIG. 1 is an exemplary front view of an espresso coffee machine, according to one embodiment.

FIG. 1 shows an exemplary front view of an espresso coffee machine, according to one embodiment. With reference to FIG. 1, an espresso coffee machine includes one or more operating units 10, each of which comprises a boiler 14, a manual actuator of a pump 16, and a heating unit 18.

Figure 2:
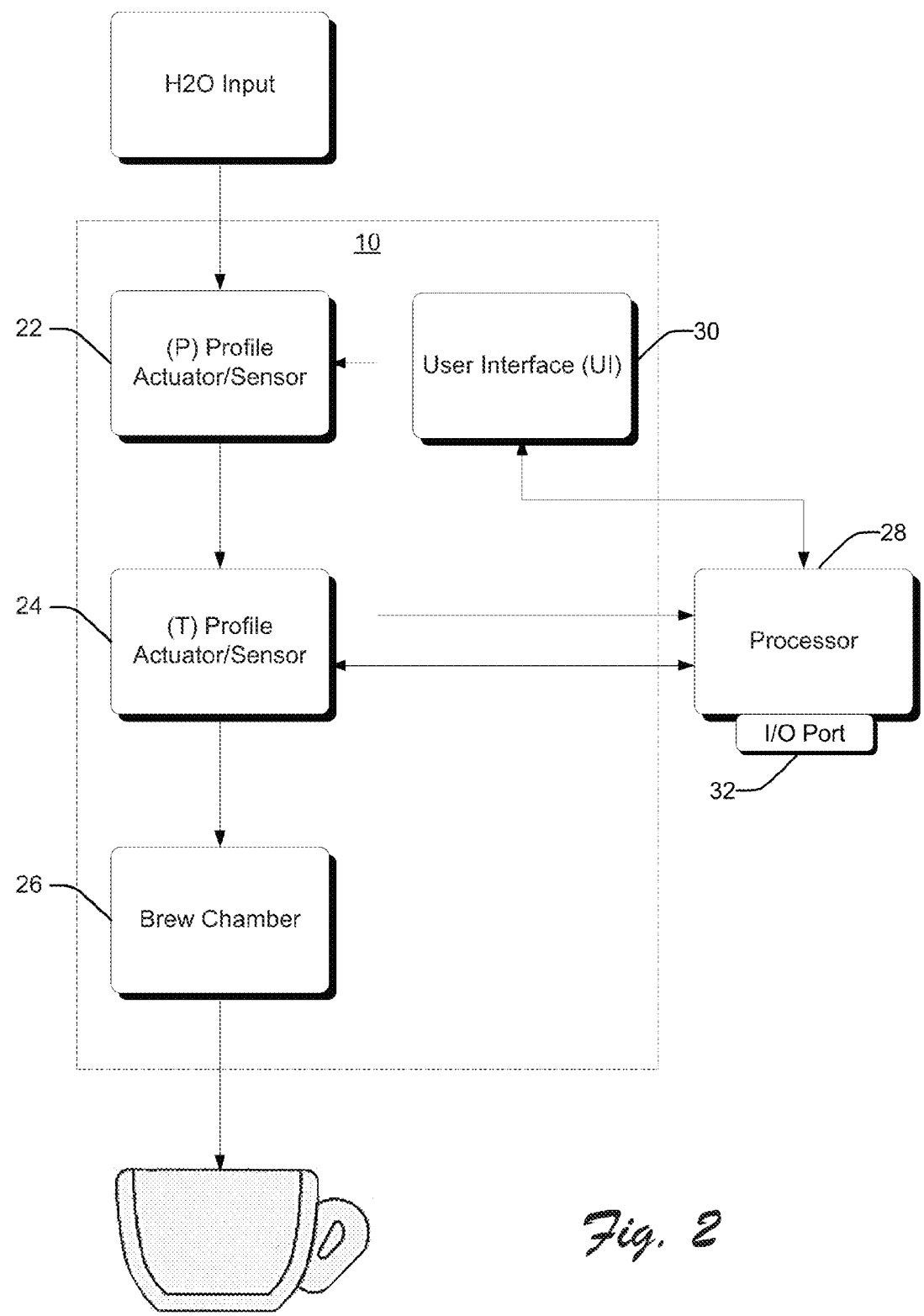
FIG. 2 illustrates an exemplary schematic working diagram of one of the espresso coffee dispensing units, according to one embodiment.

FIG. 2 illustrates an exemplary schematic working diagram of one of the espresso coffee dispensing systems/units, according to one embodiment. As illustrated in FIG. 2, each unit 10 is equipped with a system for controlling and adjusting the espresso coffee brewing parameters. For instance, there is shown a brew chamber, which is a unit 26 for aroma extraction and dispensing of the espresso coffee brew, including related conduits. The system comprises a processor or central processing unit (CPU) 28 operatively connected to: (a) a pressure control module 22; (b) a temperature control module 24, in one exemplary embodiment; and (c) to a user interface (UI) 30. In one implementation, the CPU also has an I/O port 32 for connection to a personal computer.

Through the user interface, a user can adjust the extraction pressure in real time, substantially allowing the user to optimize the pressure according to each different coffee blend used. The pressure can be adjusted, for example, by operating the pump using a manual actuator 16 of FIG. 1. For precise control of brewing, each unit 10 is equipped with a dedicated pressure gauge 18 of FIG. 1.

A better quality drink can be obtained by varying the pressure during extraction. For this purpose, according to one exemplary embodiment of these disclosed systems and methods for an improved espresso coffee machine, different pressure profiles can be stored in a memory operatively coupled to the central processing unit and accessed by the user for review/display when desired.

Figure 3:
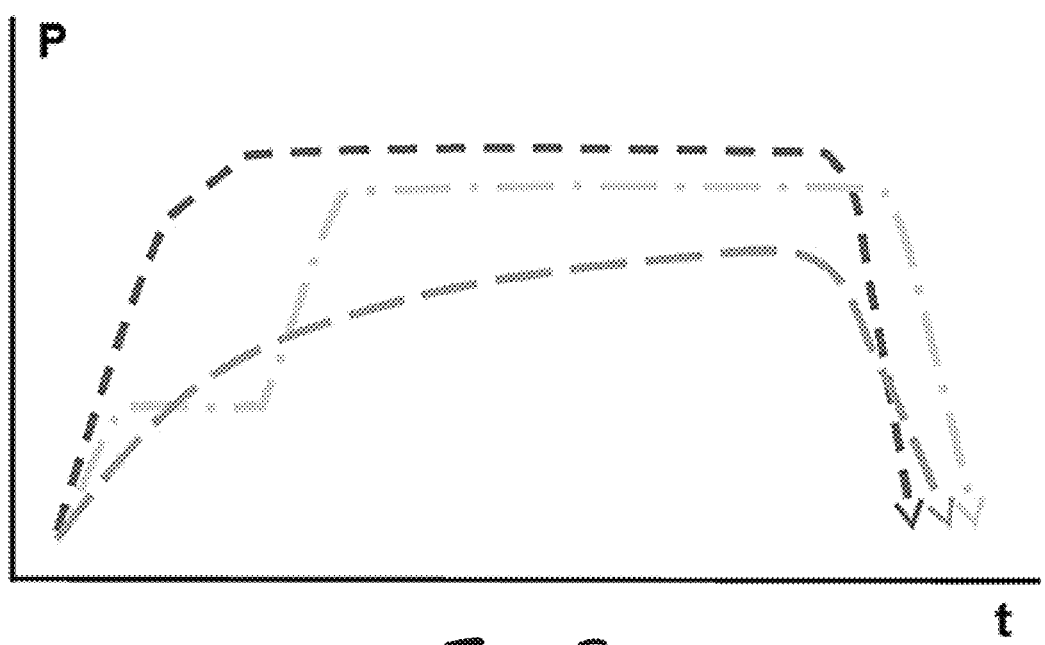
FIG. 3 shows three different and exemplary pressure profiles obtainable with a machine, according to one embodiment.

In one implementation, a desired pressure profile can be activated by the user through the user interface. The CPU drives the output of the associated control module in such a way as to reproduce the programmed pressure curve. Three different exemplary pressure profiles obtainable according to the invention are shown in FIG. 3.

In this implementation, the user can control the extraction temperature in real time. The temperature profile, therefore, can be optimized for a particular coffee variety and easily selected through the user interface. In this case, too, the CPU can be used to store different temperature profiles to be sent to the associated control module.

The embodiment described above is provided purely by way of an example and it will be understood that other equivalent embodiments are imaginable without departing from the scope of protection of the described systems and methods for an improved espresso coffee machine.

CONCLUSION

Although the above sections describe systems and methods for an improved espresso coffee machine in language specific to structural features, the implementations defined in the appended claims are not necessarily limited to the specific described features. Rather, the specific features are disclosed as exemplary forms of implementing the claimed subject matter.

The invention claimed is:

1. An espresso coffee machine comprising a plurality of operating units:
   each of the plurality of the operating units comprising:
   a pressure gauge;
   a system for controlling and adjusting espresso coffee brewing parameters;
   a boiler;
   a pump;
   a heating unit;
   an aroma extraction and espresso coffee brew dispensing unit;
   a control module operatively coupled to at least one of the pump and the heating unit, the control module operatively configured to receive at least one of pressure profiles and temperature profiles, and the control module operatively configured to vary at least one of (1) espresso coffee brew extraction pressure following a user selected one of the pressure profiles and (2) espresso coffee brew extraction temperature following a user selected one of the temperature profiles during coffee extraction;
   a processor operatively coupled to the control module and a user interface, the processor operatively configured to store the at least one of the pressure profiles and the temperature profiles and to access one or more stored ones of the pressure profiles and the temperature profiles responsive to a request by a user for reproduction of corresponding pressure parameters by the pressure control module and to interface with the temperature control module to reproduce characteristics of a user access to temperature profile, and the pressure profiles comprising a pressure increase, a maximum pressure value, and a pressure decrease; and
   a manual actuator acting on the control module.

2. The espresso coffee machine of claim 1, wherein the control module is a pressure control module operatively configured to modulate the espresso coffee brew extraction pressure.

3. The espresso coffee machine of claim 1, wherein the control module is a temperature control module operatively configured to modulate the espresso coffee brew extraction temperature.

4. The espresso coffee machine of claim 1, further comprising the processor operatively coupled to: the control module and a user interface.

5. The espresso coffee machine of claim 4, wherein the processor further comprises a port (I/O) for connection to a personal computer.

6. The espresso coffee machine of claim 4, wherein the processor is operatively configured to store temperature profile(s).

7. The espresso coffee machine of claim 6, wherein the processor is operatively configured to: (a) access, responsive to a request by a user, one or more stored temperature profiles; and (b) interface with the control module to reproduce characteristics of a user access to temperature profile.

8. The espresso coffee machine of claim 1, wherein the processor is operatively configured to access one or more stored pressure profiles responsive to a request by a user for reproduction of corresponding pressure parameters by the pressure control module.

9. The espresso coffee machine of claim 1, wherein at least one of the pressure profiles includes a first time period for an increase in pressure, a second time period for a peak time period, and a third time period for a decrease in pressure.

10. An espresso coffee machine comprising:
    one or more operating units, each operating unit comprising:
    a pressure gauge;
    a system for controlling and adjusting espresso coffee brewing parameters;
    a boiler;
    a pump;
    a heating unit;
    an aroma extraction and espresso coffee brew dispensing unit;
    a pressure control module operatively coupled to the pump, the pressure control module operatively configured to receive pressure profiles, and the pressure control module operatively configured to modulate the espresso coffee brew extraction pressure during coffee extraction following a user selected one of the pressure profiles;
    a temperature control module operatively coupled to the heating unit, the temperature control module operatively configured to receive temperature profiles, and the temperature control module operatively configured to modulate the espresso coffee brew extraction temperature during coffee extraction following a user selected one of the temperature profiles; and
    a processor operatively coupled to the pressure control module, the temperature control module, and a user interface configured to allow a user to adjust an extraction pressure in real time, so as to allow a user to optimize the extraction pressure according to each one of different coffee blends, and the processor operatively configured to store the pressure profiles and the temperature profiles.

11. The espresso coffee machine of claim 10 wherein the processor is connectable to a personal computer.

12. The espresso coffee machine of claim 10 wherein the processor is operatively configured to store pressure profiles.

13. The espresso coffee machine of claim 12 wherein the processor is operatively configured to access one or more stored pressure profiles responsive to a request by a user for reproduction of corresponding pressure parameters by the pressure control module.

14. The espresso coffee machine of claim 10 wherein the processor is operatively configured to store temperature profiles.

15. The espresso coffee machine of claim 14 wherein the processor is operatively configured to:
    (a) access, responsive to a request by a user, one or more stored temperature profiles; and
    (b) interface with the temperature control module to reproduce characteristics of a user access to temperature profile.

16. The espresso coffee machine of claim 14 wherein a temperature profile is optimized for a particular coffee variety and selected through said user interface.

17. The espresso coffee machine of claim 10, further comprising a manual actuator acting on the pressure control module.

18. The espresso coffee machine of claim 10 wherein said manual actuator adjusts the pressure by operating said pump.

19. An espresso coffee machine comprising:
    one or more operating units, each operating unit comprising:
    a pressure gauge;

a system for controlling and adjusting espresso coffee brewing parameters;
a boiler;
a pump;
a heating unit;
an aroma extraction and espresso coffee brew dispensing unit;
a pressure control module operatively coupled to the pump, the pressure control module operatively configured to receive pressure profiles, and the pressure control module operatively configured to modulate the espresso coffee brew extraction pressure during coffee extraction following a user selected one of the pressure profiles;
a manual actuator selectively acting on the pressure control module;
a temperature control module operatively coupled to the heating unit, the temperature control module operatively configured to receive temperature profiles, and the temperature control module operatively configured to modulate the espresso coffee brew extraction temperature during coffee extraction following a user selected one of the pressure profiles; and
a processor operatively coupled to the pressure control module, the temperature control module, and a user interface, the processor operatively configured to store the pressure profiles and temperature profiles and to access one or more stored ones of the pressure profiles and the temperature profiles responsive to a request by a user for reproduction of corresponding pressure parameters by the pressure control module and to interface with the temperature control module to reproduce characteristics of a user access to temperature profile.

* * * * *